(12) United States Patent
Kazmi et al.

(10) Patent No.: US 9,967,912 B2
(45) Date of Patent: May 8, 2018

(54) D2D AND CELLULAR OPERATIONS

(71) Applicant: Telefonaktiebolaget L M Ericsson (publ), Stockholm (SE)

(72) Inventors: Muhammad Kazmi, Bromma (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 14/773,583

(22) PCT Filed: Aug. 10, 2015

(86) PCT No.: PCT/SE2015/050861
§ 371 (c)(1),
(2) Date: Sep. 8, 2015

(87) PCT Pub. No.: WO2016/024906
PCT Pub. Date: Feb. 18, 2016

(65) Prior Publication Data
US 2016/0205717 A1    Jul. 14, 2016

Related U.S. Application Data

(60) Provisional application No. 62/035,816, filed on Aug. 11, 2014.

(51) Int. Cl.
*H04W 76/02* (2009.01)
*H04W 8/22* (2009.01)
(Continued)

(52) U.S. Cl.
CPC ......... *H04W 76/025* (2013.01); *H04W 8/005* (2013.01); *H04W 8/22* (2013.01);
(Continued)

(58) Field of Classification Search
CPC ...... H04W 76/025; H04W 8/22; H04W 88/06
See application file for complete search history.

(56) References Cited

U.S. PATENT DOCUMENTS

2009/0325625 A1* 12/2009 Hugl .................. H04W 52/16
455/522
2010/0093364 A1* 4/2010 Ribeiro .............. H04W 72/082
455/452.2
(Continued)

OTHER PUBLICATIONS

Unknown, Author, "Coexistence between cellular and D2D communications", InterDigital Communications, 3GPP TSG-RAN WG2 #86, R2-142691, Seoul, Korea, May 19-23, 2014, 1-3.
(Continued)

*Primary Examiner* — Nathan Mitchell
(74) *Attorney, Agent, or Firm* — Murphy, Bilak & Homiller, PLLC

(57) ABSTRACT

There is disclosed a D2D enabled node (10) for a wireless communication network, the D2D enabled node being adapted to perform a D2D operation on a first carrier frequency or band (f1) and a cellular operation on a second carrier frequency or band (f2). The D2D enabled node (10) is further adapted for obtaining information about D2D operation on f1 and obtaining information about cellular DL operation on f2, as well as being adapted for adapting at least one of the D2D operation and cellular DL operation to meet one or more requirements or to comply with one or more rules.
There are disclosed further related devices and methods.

9 Claims, 6 Drawing Sheets

(51) Int. Cl.
*H04W 8/00* (2009.01)
*H04W 48/16* (2009.01)
*H04W 88/06* (2009.01)
*H04W 92/18* (2009.01)

(52) U.S. Cl.
CPC .......... *H04W 48/16* (2013.01); *H04W 88/06* (2013.01); *H04W 92/18* (2013.01)

(56) References Cited

U.S. PATENT DOCUMENTS

| | | | | |
|---|---|---|---|---|
| 2012/0182907 | A1* | 7/2012 | Li | H04W 76/023 370/280 |
| 2013/0059583 | A1* | 3/2013 | Van Phan | H04W 72/04 455/435.1 |
| 2013/0184024 | A1* | 7/2013 | Chen | H04W 76/023 455/509 |
| 2013/0201954 | A1* | 8/2013 | Gao | H04W 72/0413 370/329 |
| 2013/0230032 | A1* | 9/2013 | Lu | H04W 76/023 370/336 |
| 2015/0016428 | A1* | 1/2015 | Narasimha | H04L 5/0058 370/336 |
| 2015/0043446 | A1* | 2/2015 | Tsirtsis | H04W 72/10 370/329 |
| 2015/0098416 | A1* | 4/2015 | Kuo | H04W 72/10 370/329 |
| 2015/0245193 | A1* | 8/2015 | Xiong | H04W 76/023 370/328 |
| 2015/0271840 | A1* | 9/2015 | Tavildar | H04L 1/08 370/329 |
| 2015/0341846 | A1* | 11/2015 | Shi | H04W 48/16 455/434 |
| 2016/0142898 | A1* | 5/2016 | Poitau | H04W 72/0413 370/329 |

OTHER PUBLICATIONS

Unknown, Author, "D2D and cellular resource multiplexing configuration", NEC, 3GPP TSG RAN WG1 Meeting #77, R1-142173, Seoul, Korea, May 19-23, 2014, 1-3.

Unknown, Author, "Discovery Monitoring in RRC Connected State", Samsung, 3GPP TSG RAN WG2 Meeting #87, R2-143265, Dresden, Germany, Aug. 18-22, 2014, 1-4.

Unknown, Author, "eNB controlled resource allocation for D2D broadcast", Fujitsu, 3GPP TSG-RAN1 #78, R1-142933, Dresden, Germany, Aug. 18-22, 2014, 1-5.

Unknown, Author, "Evaluation of Impact of D2D to WAN system performance", Alcatel-Lucent et al., 3GPP TSG RAN WGl Meeting #78, R1-143023, Dresden, Germany, Aug. 18-22, 2014, 1-7.

Unknown, Author, "D2D and cellular resource multiplexing", NEC, 3GPP TSG RAN WG1 Meeting #78, R1-143154, Dresden, Germany, Aug. 18-22, 2014, 1-4.

Unknown, Author, "Evaluation of Impact of D2D to WAN system performance", Alcatel-Lucent Shanghai Bell, Alcatel-Lucent, 3GPP TSG RAN WG1 Meeting #78bis, R1-144073, Ljubljana, Slovenia, Oct. 6-10, 2014, 1-11.

* cited by examiner

D2D AND CELLULAR OPERATIONS

TECHNICAL FIELD

This disclosure pertains to D2D communication in the context of wireless communication.

BACKGROUND

With the introduction of D2D communication into wireless communication systems, a variety of issues arise. In particular, the use or sharing of resources, both time-frequency resources and physical resources like radio circuitry, between D2D and cellular operation modes provides new challenges.

SUMMARY

It is an object of the present disclosure to provide improved operation of a D2D enabled node, in particular if performing both D2D operation and cellular DL operation (reception of cellular signals).

There is generally discussed a D2D enabled node for a wireless communication network. The D2D enabled node is adapted to perform a D2D operation on a first carrier frequency or band (f1) and a cellular operation on a second carrier frequency or band (f2). The D2D enabled node further is adapted for obtaining information about D2D operation on f1 and obtaining information about cellular DL operation on f2. The D2D enabled node is also adapted for adapting at least one of the D2D operation and cellular DL operation to meet one or more requirements or to comply with one or more rules.

There is also disclosed a method performed by a D2D enabled node for a wireless communication network. The method comprises performing a D2D operation on a first carrier frequency or band (f1) and a cellular operation on a second carrier frequency or band (f2). The method further comprises obtaining information about D2D operation on f1 and obtaining information about cellular DL operation on f2. Moreover, the method comprises adapting at least one of the D2D operation and cellular DL operation to meet one or more requirements or to comply with one or more rules to ensure a certain level of the cellular DL performance.

Moreover, there is proposed a network node for a wireless communication network. The network node is adapted for obtaining information about D2D operation of a D2D enabled node on a first carrier frequency or band (f1) and for obtaining information about cellular DL operation of the D2D enabled node on a second carrier frequency or band (f2). The network node also is adapted for configuring the D2D enabled node for adapting at least one of the D2D operation and cellular DL operation to meet one or more requirements or to comply with one or more rules.

A method performed by a network node for a wireless communication network is disclosed. The method comprises obtaining information about D2D operation of a D2D enabled node on a first carrier frequency or band (f1). Moreover, the method comprises obtaining information about cellular DL operation of the D2D enabled node on a second carrier frequency or band (f2). The method also comprises configuring the D2D enabled node for adapting at least one of the D2D operation and cellular DL operation to meet one or more requirements or to comply with one or more rules.

There is also disclosed a computer program product comprising instructions executable by control circuitry, the instructions causing the control circuitry to carry out and/or control any one of the methods disclosed herein when executed by the control circuitry.

Moreover, there is suggested a storage medium adapted to store instructions executable by control circuitry, the instruction causing the control circuitry to carry out and/or control any one of the methods disclosed herein when executed by the control circuitry.

BRIEF DESCRIPTION OF THE DRAWINGS

The drawings are provided to illuminate and illustrate concepts described herein, without limiting them to the subject matter shown in the figures, which show.

DETAILED DESCRIPTION

Generally, a UE may be considered as an example or representative of a D2D enabled node, and the term D2D enabled node may be interchanged for UE unless explicitly stated otherwise. An eNB or base station may be considered to be one variant of a network node.

Figure 2:
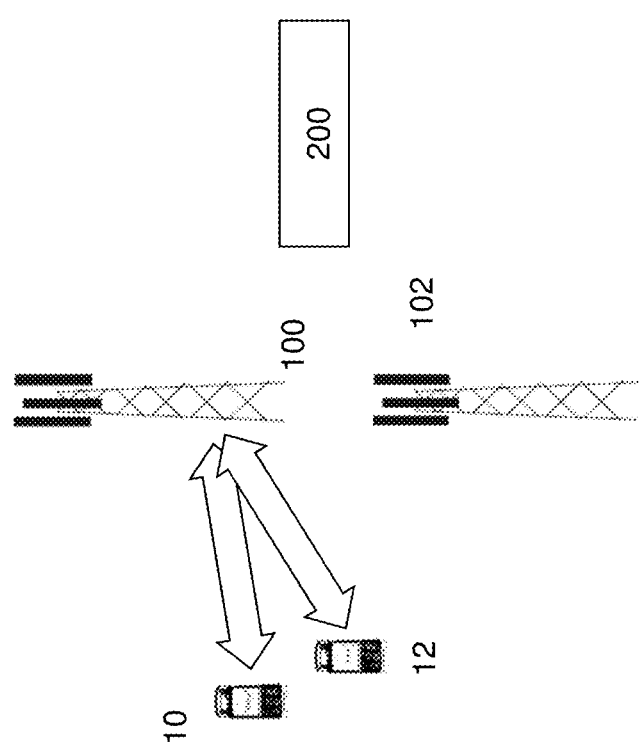
FIG. 2 a "Locally-routed" data path in the EPS for communication between two UEs when UEs are served by the same eNBs.
Figure 3:
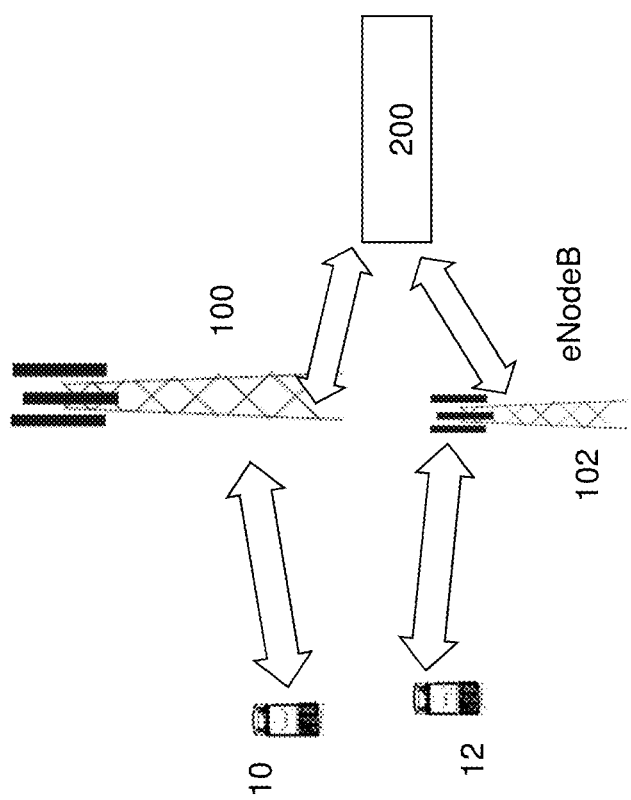
FIG. 3 a default data path scenario in the EPS for cellular communication between two UEs.

If D2D enabled nodes or UEs are in proximity to each other, they may be able to use a "direct mode" (e.g., as in FIG. 1) or "locally-routed" (e.g., as in FIG. 2) path for data communication, unlike in the conventional cellular communication (FIG. 3). In such device-to-device communication (D2D), which may also be called "ProSe" (for PROximity SErvices), the source and the target are wireless devices like D2D enabled nodes, e.g., UEs. Some of the potential advantages of D2D or ProSe are off-loading of the cellular network, faster communication, increased awareness of surrounding wireless devices of interest (e.g., running the same application), higher-quality links due to a shorter distance, etc. Some appealing applications of D2D communications are video streaming, online gaming, media downloading, peer-to-peer (P2P), file sharing, etc.

Figure 1:
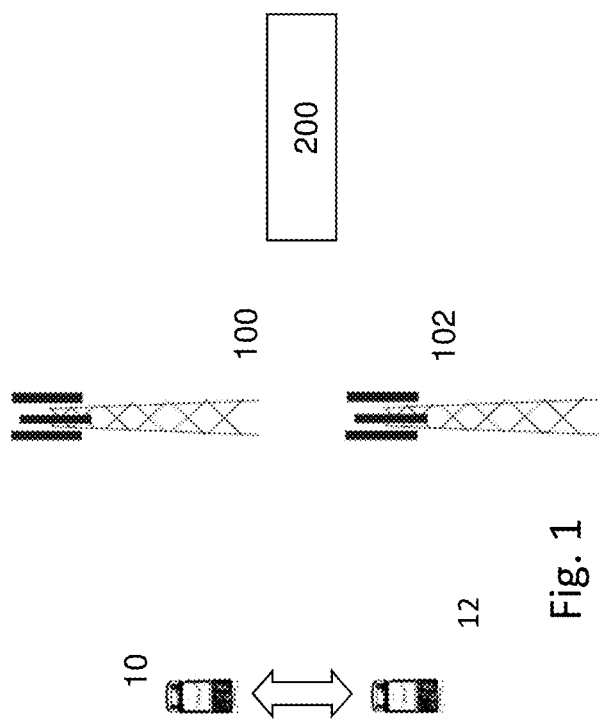
FIG. 1 a "Direct mode" data path in the EPS for communication between two UEs.

In FIGS. 1 to 3, there are shown different setups for communication of user equipments within a wireless communication network. In these figures, the first node or first user equipment UE1 is indicated with reference numeral 10, the second node or second user equipment is indicated with reference numeral 12.

A first base station or network node, which may be an eNodeB and/or EPC according to LTE/E-UTRAN, carries the reference numeral 100, whereas a second base station, which may be an eNodeB and/or EPC according to LTE/UTRAN, is referenced with numeral 102. The nodes 100, 102 may be configured as coordinating nodes for D2D communication between the UEs 10, 12.

Reference numeral 200 indicates higher layer functions or devices of the network, to which the base stations 100, 102 may be connected or connectable, e.g. LTE packet core elements like SGW (Server GateWay) and/or PGW (PDN GateWay) and/or MME (Mobility Management Entity).

If UEs 100, 102 are in proximity to each other, they may be able to use a "direct mode" (e.g., as in FIG. 1) or "locally-routed" (e.g., as in FIG. 2) path for data communication, unlike in the conventional cellular communication (FIG. 3).

Figure 4:
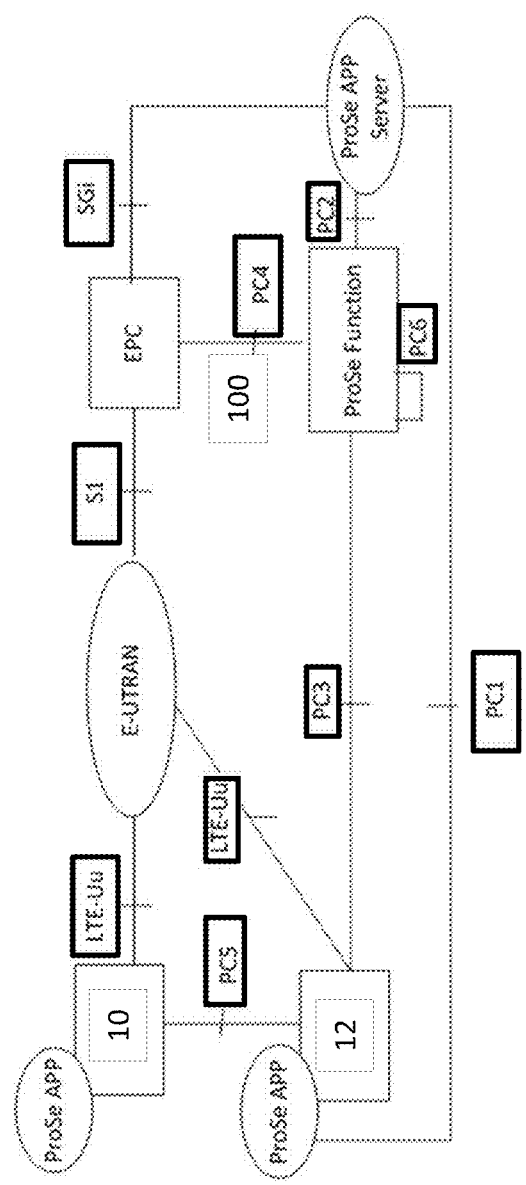
FIG. 4 an exemplary D2D architecture.

A more detailed example reference architecture for D2D operation according to one possible LTE/E-UTRAN implementation is illustrated in FIG. 4, in which only a setup with two UEs 10, 12 connected to a common base station or eNodeB 100 is shown. In FIG. 4, PCn identifies different reference points or interfaces. PC1 refers to a reference point between a ProSe application ProSe APP running on an D2D enabled node or UE 10 or 12, PC2 a reference point between an ProSe Application server and a ProSe function provider on a server or base station side. PC3 indicates a reference point between the D2D enabled node or UE 12 and the ProSE function, e.g. for discovery and/or communication. PC4 refers to a reference point between the EPC and the ProSe function, e.g. for setting up setting up one-to-one communication between UEs 10 and 12. PC5 is a reference point between D2D enabled node or UE 10 and D2D enabled node or UE 12, e.g. a first node and a second node involved in D2D communication, which may be used e.g. for direct or relayed communication between the UEs. PC6 identifies a reference point between ProSe functions of different networks, e.g. if UEs 10, 12 are subscribed to different PLMNs (Public Land Mobile Networks). SGi indicates an interface which may be used, inter alia, for application data and/or application level control. The EPC (Evolved Packet Core) may generally include a plurality of core packet functions or entities, e.g. MME, SGW, PWG, PCRF (Policy Charging and Rules Function), HSS (Home Subscriber Server), etc. E-UTRAN is the preferred RAT of the arrangement of FIG. 4. LTE-Uu indicates data transmission connections between the UEs 10, 12 and the base station 100.

Figure 5:
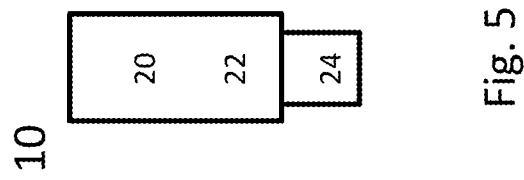
FIG. 5 an exemplary D2D enabled node or UE.

FIG. 5 schematically shows a D2D enabled node or user equipment 10, which may be a node of a device-to-device communication, in closer details. User equipment 10 comprises control circuitry 20, which may comprise a controller connected to a memory. A receiving module and/or transmission module and/or control module may be implemented in the control circuitry 20, in particular as module in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for device-to-device communication, in particular utilizing E-UTRAN/LTE resources as described herein and/or receiving allocation data and/or transmit D2D data based on allocation data.

Figure 6:
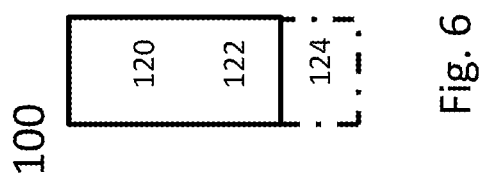
FIG. 6 an exemplary base station or network node.

FIG. 6 schematically show a base station 100, which in particular may be an eNodeB. Base station 100 comprises control circuitry 120, which may comprise a controller connected to a memory. A configuring unit and/or a determination unit may be comprised in the control circuitry, the latter in particular if the base station is configured as a coordinating node. The control circuitry is connected to control radio circuitry 122 of the base station 100, which provides receiver and transmitter and/or transceiver functionality. It may be considered that control circuitry 120 comprises an extracting unit as described herein, in particular if the base station is configured to participate as a device in D2D communication. An antenna circuitry 124 may be connected or connectable to radio circuitry 122 to provide good signal reception or transmittance and/or amplification.

Each or any one of the user equipments shown in the figures may be adapted to perform the methods to be carried out by a user equipment or D2D enabled node described herein. Alternatively or additionally, each or any of the user equipments shown in the figures may comprise any one or any combination of the features of a user equipment or D2D enabled node described herein. Each or any one of the network nodes or eNBs or base stations shown in the figures may be adapted to perform the methods to be carried out by network node or base station described herein. Alternatively or additionally, the each or any one of the network nodes or eNBs or base stations shown in the figures may comprise any one or any one combination of the features of a network node or eNB or base station described herein.

Radio measurements of a D2D enabled node or UE on cellular signals are discussed in the following. The D2D enabled node or UE performs several radio measurements on cellular signals. They are used for one or more purposes e.g. to establish and keep the connection, ensuring the quality of a radio link, cell change, cell reselection, positioning etc.

The measurements may be used e.g. in RRC idle state operations (for example, in LTE systems) such as cell selection, cell reselection (e.g. between E-UTRANs, between different RATs, and to non-3GPP RATs), and minimization of drive test (MDT), and also in RRC connected state operations such as for cell change (e.g. handover between E-UTRANs, handover between different RATs, and handover to non-3GPP RATs).

The D2D enabled node or UE has to first detect or identify a cell and, therefore, cell identification e.g. acquisition of a physical cell identity (PCI), is also a signal measurement.

The D2D enabled node or UE may also have to acquire the cell global ID (CGI) of a D2D enabled node or UE. Therefore, cell search (aka cell detection or cell identification), CGI acquisition etc. are also types of radio measurements.

The RSRP and RSRQ are used for at least RRM such as for mobility, which include mobility in RRC connected state as well as in RRC idle state. The RSRP and RSRQ are also used for other purposes such as for enhanced cell ID positioning, minimization of drive test etc.

In RRC connected state, the D2D enabled node or UE can perform intra-frequency measurements without measurement gaps. However, as a general rule the D2D enabled node or UE may perform inter-frequency and inter-RAT measurements in measurement gaps unless it is capable of performing them without gaps. To enable inter-frequency and inter-RAT measurements for the D2D enabled node or UE requiring gaps, the network has to configure the measurement gaps. Two periodic measurement gap patterns both with a measurement gap length of 6 ms are defined for LTE:

Measurement gap pattern #0 with repetition period 40 ms
Measurement gap pattern #1 with repetition period 80 ms The measurements performed by the D2D enabled node or UE are then reported or transmitted to the network, e.g. via a network node or base station or eNB, which may use them for various tasks.

The D2D enabled node or UE also performs measurements on the serving cell (aka primary cell) in order to monitor the serving cell performance. This is called radio link monitoring (RLM) or RLM related measurements in LTE. For RLM, the D2D enabled node or UE monitors the downlink link quality based on the cell-specific reference signal in order to detect the downlink radio link quality of the serving or PCell. In order to detect out of sync and in sync, the D2D enabled node or UE compares the estimated quality with the thresholds Qout and Qin respectively. The threshold Qout and Qin are defined as the level at which the downlink radio link cannot be reliably received and corresponds to 10% and 2% block error rate of a hypothetical PDCCH transmissions respectively.

Examples of D2D enabled node or UE positioning measurements in LTE are:
Reference signal time difference (RSTD)
D2D enabled node or UE RX-TX time difference measurement The D2D enabled node or UE RX-TX time difference measurement requires the D2D enabled node or UE to perform measurement on the downlink reference signal as well as on the uplink transmitted signals. RSTD measurement is performed by the D2D enabled node or UE on positioning reference signal (PRS) signals transmitted by a reference cell and a neighbor cell. PRS are sent by the network node or eNodeB in PRS subframes in a positioning occasion which occurs periodically.

CSI measurements performed by the D2D enabled node or UE are used for scheduling, link adaptation etc. by network. Examples of CSI measurements are CQI, PMI, RI etc. They may be performed on reference signals like CRS, CSI-RS or DMRS. The mentioned measurements may refer to cellular operation.

However, a D2D enabled node or UE using its receiver for operating D2D on one carrier frequency, may be not able to receive signals or channels in DL on another carrier frequency, which may impact, e.g.,
DL measurements of the D2D enabled node or UE, bidirectional measurements of D2D enabled node or UE and eNodeB which involve a DL component, receiving system information (e.g., MIB, SIB1, other SIBs, etc.), control information such as scheduling DL and UL grants transmitted by the network in DL on PDCCH and EPDCCH, positioning measurements, RLM, cell identification and synchronization, CSI measurements used for scheduling.

There is generally discussed a D2D enabled node for a wireless communication network. The D2D enabled node may be adapted to perform a D2D operation on a first carrier frequency or band (f1) and a cellular operation on a second carrier frequency or band (f2). The D2D enabled node may further be adapted for obtaining information about D2D operation on f1 and obtaining information about cellular DL operation on f2. The D2D enabled node may be adapted for adapting at least one of the D2D operation and cellular DL operation to meet one or more requirements or to comply with one or more rules. Accordingly, the D2D/cellular operation of the D2D enabled node may be adapted to operational conditions or requirements.

There is also disclosed a method performed by a D2D enabled node for a wireless communication network. The method may comprise performing a D2D operation on a first carrier frequency or band (f1) and a cellular operation on a second carrier frequency or band (f2). The method may further comprise obtaining information about D2D operation on f1 and obtaining information about cellular DL operation on f2. It may be considered that the method may comprise adapting at least one of the D2D operation and cellular DL operation to meet one or more requirements or to comply with one or more rules to ensure a certain level of the cellular DL performance.

Moreover, there is proposed a network node for a wireless communication network. The network node may be adapted for obtaining information about D2D operation of a D2D enabled node on a first carrier frequency or band (f1) and for obtaining information about cellular DL operation of the D2D enabled node on a second carrier frequency or band (f2). The network node may be adapted for configuring the D2D enabled node for adapting at least one of the D2D operation and cellular DL operation to meet one or more requirements or to comply with one or more rules.

A method performed by a network node for a wireless communication network is disclosed. The method may comprise obtaining information about D2D operation of a D2D enabled node on a first carrier frequency or band (f1). It may be considered that the method comprises obtaining information about cellular DL operation of the D2D enabled node on a second carrier frequency or band (f2). The method may comprise configuring the D2D enabled node for adapting at least one of the D2D operation and cellular DL operation to meet one or more requirements or to comply with one or more rules.

There is also disclosed a computer program product comprising instructions executable by control circuitry, the instructions causing the control circuitry to carry out and/or control any one of the methods disclosed herein when executed by the control circuitry.

Moreover, there is suggested a storage medium adapted to store instructions executable by control circuitry, the instruction causing the control circuitry to carry out and/or control any one of the methods disclosed herein when executed by the control circuitry.

Adapting may comprise at least one of establishing a time relation between f1 and f2, determining the need for adaptation and adaptation. It is thus possible to perform adapting in multiple ways, enabling reacting to a wide variety of conditions and situations.

In some variants, adapting may comprise adapting the receiver configuration while receiving system information. Accordingly, it may be reacted to the transmission of system information, which usually has a high priority. Adapting the receiver configuration may facilitate reception of such information.

System information may generally comprise at least one or more of: MIB, SIB1, other SIBs.

In some variants, the D2D enabled node or UE may not be able to receive in cellular DL operation while using an only rx for D2D.

There are described methods in and/or for and/or performed by a D2D enabled node or UE, comprising steps of:
Step 1: Obtaining information about D2D operation on f1;
Step 2: Obtaining information about its cellular DL operation on f2;
Step 3 (optional): Determining priority of the cellular DL operation and/or D2D operation;
Step 4: Adapting at least one of the D2D operation and cellular DL operation to meet one or more requirements or to comply with one or more rules to ensure a certain level of the cellular DL performance. At least one of the following steps is performed as part of adapting:
Step 4a (optional): Establishing time relation between f1 and f2.
Step 4b (optional): Determining the need for adaptation
Step 4c (optional): Adaptation There is described a D2D enabled node or UE adapted to perform such a method and/or these methods. The D2D enabled node or UE may generally be adapted to perform and/or perform a D2D operation on f1 (in particular, a first carrier frequency or band, which may be f1) and/or cellular operation on f2 (in particular, a second carrier frequency or band, which may be f2). f1 and f2 may be different and may refer to carrier aggregates. A D2D device may comprise a D2D first obtaining module for obtaining information according to step 1. It may be considered that the D2D device comprises a D2D second obtaining module for obtaining information according to step 2. Optionally, the D2D device may comprise a D2D determining module for determining according to step 3. The D2D device may comprise a D2D adaption module for adapting according to step 4, which may be for performing any one or any combination of the step 4a, 4b and 4c.

Methods in and/or for and/or performed by a network node are described. The methods may comprise steps of:

Step N1: Obtaining information about D2D enabled node or UE D2D operation on f1;

Step N2: Obtaining information about D2D enabled node or UE cellular DL operation on f2;

Step N3 (optional): Determining priority of the cellular DL operation and/or D2D operation for the D2D enabled node or UE;

Step N4: Adapting at least one of the D2D operation and cellular DL operation to meet one or more requirements or to comply with one or more rules to ensure a certain level of the cellular DL performance. Adapting by the network node may comprise configuring the D2D enabled node or UE.

There is described a network node adapted to perform such a method and/or these methods, which may in particular be a base station and/or eNB and/or allocation node and/or coordinating and/or controlling node. The D2D enabled node or UE may generally be adapted to perform and/or perform a D2D operation on f1 (in particular, a first carrier frequency or band, which may be f1) and/or cellular operation on f2 (in particular, a second carrier frequency or band, which may be f2). f1 and f2 may be different and may refer to carrier aggregates. A network device may comprise a NW first obtaining module for obtaining information according to step N1. It may be considered that the network device comprises a NW second obtaining module for obtaining information according to step N2. Optionally, the network device may comprise a NW determining module for determining according to step N3. The network device may comprise a NW adaption module for adapting according to step N4, which may include configuring the D2D enabled node.

The approaches described may provide:

The D2D enabled node or UE, when in and/or configured with and/or for D2D operation, may also continue with certain critical cellular operations, which may require the D2D enabled node or UE to perform radio measurements e.g. radio link monitoring (in cellular operation).

The mobility performance of a D2D enabled node or UE, when in and/or configured with and/or for D2D operation can be maintained, e.g. by ensuring that the D2D enabled node or UE also does important or necessary mobility measurements (in cellular operation).

The method enables the network node to prioritize between D2D operation and cellular operation related to radio measurements. The prioritization may be done situation dependent, e.g. based on which of the two operations is more critical and urgent in a given situation.

Performance of emergency calls requiring the D2D enabled node or UE to perform one or more positioning measurements is not degraded when the D2D enabled node or UE is also in and/or configured with and/or for D2D operation.

There are described

Methods in a D2D enabled node or UE; and a D2D enabled node or UE

Methods in a network node; and a network node

Some non-limiting example scenarios in which the embodiments described in the current disclosure are described below.

A D2D enabled node or UE may be adapted to share, and/or share, its and/or one of its receiver/s between D2D operation on carrier frequency f1 of frequency band B1 and cellular DL operation on carrier frequency f2 of frequency band B2, wherein Operation on f1 and f2 may or may not be time-synchronized, e.g., radio frame numbering and/or subframe numbering may be different on f1 and f2 and they may or may not be time-aligned, and the following RF scenarios may occur:

f1=f2, B1=B2;

f1 is different from f2, B1=B2, (e.g., f1 may be in the UL spectrum of B1 and f2 may be in the DL spectrum of B2=B1);

f1 is different from f2, B1 is different from B2;

The D2D enabled node or UE may additionally be adapted to operate, and/or operate, cellular UL on f3 (f3 may be the same or different from f1);

The D2D enabled node or UE may or may not have other receivers or receiver chains. In case the D2D enabled node or UE has at least one other receiver, it may be assumed herein that it is not used or cannot be used on f1 and f2 for D2D operation and cellular DL operation, respectively, e.g., because it is reserved for other purposes or cannot be used or not available in the resources configured on f1 and f2 for D2D and cellular DL. For example the D2D enabled node or UE may be adapted and/or configured to use the other receiver for multi-carrier operation, i.e. for receiving signals on secondary carrier.

Methods in a D2D enabled node or UE are described in the following. According to this variant, a D2D enabled node or UE may be adapted to perform and/or implements, and/or performs, steps of the following:

Step 1: Obtaining information about D2D operation on f1,

Step 2: Obtaining information about its cellular DL operation on f2,

Step 3 (optional): Determining priority of the cellular DL operation and/or D2D operation, Step 4: Adapting at least one of the D2D operation and cellular DL operation to meet one or more requirements or to comply with one or more rules to ensure a certain level of the cellular DL performance. At least one of the following steps is performed:

Step 4a (optional): Establishing time relation between f1 and f2.

Step 4b (optional): Determining the need for adaptation

Step 4c (optional): Adaptation

The steps above may be performed in a different order and may also be complemented with other steps. There are also disclosed a corresponding D2D device and/or a D2D enabled node or UE.

Obtaining information about D2D operation on f1 is discussed in the following.

The information may comprise, e.g., any one or any combination of:

Type of the D2D operation,

An indication that the D2D enabled node or UE needs to perform a D2D operation,

A configuration for D2D operation on f1, e.g., carrier frequencies available or configured or allocated for D2D enabled node or UE's D2D operation, scheduled time-frequency resources, scheduling grant, D2D resource pool from which resources may be selected, D2D transmit or receive pattern, periodicity for transmission or receiving, bandwidth, frequency hopping configuration, data format, an identity to be used for transmitting or receiving D2D signals.

The obtaining may comprise any one or any combination of, e.g.:

Receiving explicitly (via broadcast/multicast/unicast, higher layers or physical layer) from another D2D enabled node or UE or a network node (e.g., eNodeB), Receiving implicitly from another D2D enabled node or UE or a network node (e.g., eNodeB), Receiving a request for D2D operation on f1 from another D2D enabled node or UE or a network node, Receiving from higher layers or from an application (e.g., a trigger by an application), Determining based on measurements or sensing (e.g., obtaining time synchronization, determining time-frequency resources for D2D operation), Reading a pre-defined or pre-configured configuration e.g. performing D2D operation periodically or in certain subframe or in subframes during which D2D signals from other D2D enabled node or UEs are expected to be received.

Obtaining information about cellular DL operation on f2 is described in the following. The information may comprise, e.g., any one or any combination of:

Type of the cellular DL operation (this may in turn determine which signal/channel to measure and when), An indication that the D2D enabled node or UE needs to perform a cellular DL operation, A configuration for cellular DL operation on f2, e.g., DL measurement configuration, bidirectional measurement configuration (D2D enabled node or UE measurement or eNodeB measurement comprising at least a DL component), critical measurement configuration for a specific purpose (e.g. positioning, public safety or emergency), periodicity of cellular DL signal/channel to be received by the D2D enabled node or UE, pre-defined time resources when the D2D enabled node or UE should receive a DL signal/channel in response to its UL transmission, control channel with critical data (e.g., scheduling grants).

The obtaining may comprise, e.g., any one or any combination of:

Receiving explicitly (via broadcast/multicast/unicast, higher layers or physical layer) from another D2D enabled node or UE or a network node (e.g., eNodeB, positioning node), Receiving implicitly from another D2D enabled node or UE or a network node (e.g., eNodeB, positioning node), Receiving a request for D2D operation on f1 from another D2D enabled node or UE or a network node (e.g., eNodeB, positioning node), Receiving from higher layers or from an application (e.g., a trigger by an application), Determining based on measurements or sensing (e.g., obtaining time synchronization, determining subframes for receiving SI, etc.), Reading a pre-defined or pre-configured configuration e.g. performing certain type of measurements at periodic intervals or in certain subframes (e.g. cell identification in DL subframes #0 and/or #5).

Determining priorities is discussed in the following. In one embodiment, absolute priority of one or both of the cellular DL operation and D2D operation may be determined (e.g., 'highest', 'best-effort or low', 'priority level 3', etc.).

In another embodiment, relative priority of one operation type with respect to the other one may be determined (e.g., 'priority level 3' for D2D is lower than 'priority level 1' for cellular DL).

In yet another embodiment, the priority may be associated with overlapping subframes only. In yet another embodiment, the priority may be associated with not all but some of the overlapping subframes.

In yet another embodiment, the priority may be associated with a specific cellular DL and/or D2D measurements/signals.

In yet another embodiment, cellular DL operation may always have a higher priority than a D2D operation.

In yet another embodiment, cellular DL operation in certain time-frequency resources may always have a higher priority than a D2D operation.

In yet another embodiment, not every cellular DL operation has a higher priority than any D2D operation and not every cellular DL operation has a lower priority than any D2D operation.

In yet another embodiment, the priority(-ies) may be pre-defined, determined by the D2D enabled node or UE, configurable by a network node (and received by the D2D enabled node or UE). The priority may also depend on conditions, D2D enabled node or UE activity state, time-frequency resources, signal/channel type, etc. For example, cellular DL operation may be prioritized less frequent when D2D enabled node or UE is in RRC_IDLE than when the D2D enabled node or UE is in RRC_CONNECTED.

As a result of determining priority(-ies), the importance of the first operation type is established over the second operation type, e.g., it is determined that cellular DL operation is prioritized over D2D operation.

Determining priority may be based on any one of the above criteria or conditions or any combination thereof.

Methods of adapting D2D and/or cellular DL operation are discussed in the following. According to this part of the disclosure, the D2D enabled node or UE may perform and/or be adapted to perform at least one of the steps below:

(optional) Establishing time relation between f1 and f2,
(optional) Determining the need for adaptation,
(optional) Adaptation.

Establishing time relation is discussed in the following. According to this variant, a time relation is established between f1 and f2 and/or between D2D and cellular DL resources.

The time relation may be determined in one or more of the ways: pre-defined, known from earlier operation or historical information stored in the D2D enabled node or UE, determined based on the assistance data from the network or another D2D enabled node or UE (e.g., a relative offset between D2D and cellular DL resources may be provided), or determined by performing measurements on at least one of f1 and f2. This step may be used to determine whether there is an overlap in time between D2D operation on f1 and cellular DL operation on f2. The overlap may also comprise additional minimum time separation between D2D and cellular DL operations, e.g., due to frequency switching.

The D2D enabled node or UE may be adapted to perform, and/or perform, no adaptation or adaption, if there is no overlap (e.g., adaption of scheduling may be unnecessary).

Alternatively, the D2D enabled node or UE may be adapted to perform, and/or may perform, the adaption or adaptation if there is no overlap (e.g., to facilitate DRX for power saving purpose); in this case, it may be adapted to use, and/or may use, the time relation during the adaptation and/or may be adapted to perform the adaption, and/or may perform the adaption, based on the time relation.

It should be noted that adaption and adaptation are used interchangeably and are intended to have identical meaning.

Determining the need for adaptation is discussed in the following. The need for adaptation, and/or the adaption, may be determined based on any one or any combination of, e.g.:
- Time overlap; it may also be based on the amount of it between the resources for D2D operation and resources for cellular DL operation.
- Time relation between f1 and f2,
- Time relation between D2D resources and cellular DL resources, when they are configured,
- Priority of at least one of the D2D operation and cellular DL operation.

The D2D enabled node or UE may perform, and/or be adapted to perform, the adaptation, when it is determined to perform the adaptation and/or the need for such is determined and/or based on determination of a need for the adaptation according to one or any combination of criteria. Otherwise, the D2D enabled node or UE may choose to not perform the adaptation and/or be correspondingly adapted.

Adaptation is discussed in the following. According to this part, the D2D enabled node or UE adapts, and/or is adapted to adapt and/or configure, at least one of the D2D operation and cellular DL operation to meet one or more requirements and/or to comply with one or more rules to ensure a certain performance level of the prioritized operation, e.g., cellular DL performance.

The adaptation herein may comprise, e.g., any one or more of:
- Indicating the need for adaptation, e.g. to a network node, or to another D2D enabled node or UE,
- Indicating, e.g. to a network node or to another D2D enabled node or UE, that the adaptation has been performed,
- Rejecting or delaying the operation/type of operation (e.g. cellular or D2D) which is not prioritized,
- Sending a resource request to a network node; the request may also indicate preferred resources for the prioritized operation,
- Adapting TDD UL/DL and special subframe configuration,
- Using the receiver for the prioritized operation type in at least some resources overlapping with those for the lower-priority operation type, e.g.:
- Adapting resources for D2D operation (e.g., (re)configure to not perform the D2D operation in some resources overlapping with cellular DL operation if the latter is prioritized);
- Adapting resources for cellular DL operation (e.g., (re) configure to perform the cellular DL operation in some resources overlapping with D2D operation if the latter has a lower priority);
- Adapting at least one measurement procedure for cellular DL and/or D2D to avoid/reduce performing measurements in the overlapping resources;
- Adapting D2D enabled node or UE activity configuration on at least one of: f1 and f2;
- Adapting measurement gap configuration (e.g., when cellular DL operation comprises DL measurements in measurement gaps; the measurement gap configuration may be autonomous measurement gap configuration or D2D enabled node or UE measurement configuration for the measurements to be performed by the D2D enabled node or UE in measurement gaps configured by the network);
- Adapting D2D gap configuration;
- Adapting the receiver configuration while receiving system information (e.g., at least one or more of: MIB, SIB1, other SIBs, etc.);
- Adapting measurements performed in measurement patterns (e.g., measurement resource restriction pattern, measurement gap pattern, positioning subframe configuration pattern, MBSFN pattern, discovery reference signal (DRS) transmission pattern when cell operates in off state, etc.);
- Adapting MBMS measurements;
- Adapting (e.g., increasing) at least one timer and/or the number of attempts of the associated UL transmissions related to detecting whether a network response (e.g., with a scheduling grant or ACK/NCK) is received or not;
- Increased number of receiving attempts may be needed for DL channels to meet one or more performance requirements, e.g., a BLER requirement.

Examples of rules are discussed in the following. The rules may be pre-defined or configurable (e.g., when a network configures at least one parameter in the rule and/or a condition when the rule applies and/or turns on/off the rule).

In order to ensure that a radio network node (e.g. D2D enabled node or UE or a radio network node) performs one or more measurements and meets corresponding requirements one or more pre-defined rules can be specified in the standard.

Note that when the measurements are performed in an asynchronous cells, i.e., when the system frame numbers (SFN) of two cells are misaligned, or when the radio frame or subframe boundaries are not aligned or not aligned within a few microseconds (e.g. 3 µs), time relation between the cells needs to be established to determine and locate the time instances for the necessary measurements on a non-serving cell (the receiver and search window need to be configured correspondingly).

The minimum necessary time separation, if any is needed e.g. for the receiver to switch between D2D and cellular DL operation, may also be accounted for. Examples of such rules are (described for D2D enabled node or UE, but may be applied to a radio network node in general) given below. Any one or any combination of these rules may be applied by the D2D enabled node or UE when the D2D enabled node or UE is configured or triggered to perform D2D and cellular operations, in particular during at least partly overlapping time. More specifically, any one or any combination of these rules may be applied by the D2D enabled node or UE when the D2D enabled node or UE is configured or triggered to perform D2D and radio measurements related to cellular operations during at least partly overlapping time (which may be overlapping time of D2D operation and cellular operation with the receiver setup described above, in particular with one receiver).

The D2D enabled node or UE may be configured for D2D and/or cellular operations based on configuration or request received from the network node and/or based on one or more pre-defined rules or based on D2D enabled node or UE autonomous decision. Some rules may require the D2D enabled node or UE to prioritize D2D operation over cellular operation (in particular, radio measurements). However some rules may require the D2D enabled node or UE to prioritize cellular operation (in particular, radio measurements) over D2D operation.

the D2D enabled node or UE may be adapted to perform, and/or may perform, and/or shall be able to perform, when it is also configured for D2D operation, radio link monitoring (RLM e.g. out of sync and in sync detection etc), and may be adapted to meet the corresponding RLM pre-defined requirements provided at least one DL subframe per radio frame is available for RLM measurements at the D2D enabled node or UE. This rule requires the D2D enabled node or UE to skip D2D operation in a subframe in which the D2D enabled node or UE has to perform RLM. In other words, the rule requires the D2D enabled node or UE to prioritize the RLM measurements over D2D operation;

the D2D enabled node or UE may be adapted to perform, and/or perform, and/or shall be able to perform mobility related intra-frequency RRM measurements (e.g. cell search, RSRP, RSRQ and CGI reading) and may be adapted to meet the corresponding requirements provided certain number of subframes, or certain specific subframes or subframes with specific signals (e.g. DL subframe #0 and/or DL subframe #5) of the measured cell(s) are available at the D2D enabled node or UE over the measurement time, i.e., the D2D enabled node or UE can perform the measurements in these subframes of the measured cells. This rule also requires the D2D enabled node or UE to skip D2D operation in certain subframe where D2D enabled node or UE has to perform certain radio measurements and meet the corresponding requirements;

the D2D enabled node or UE may be adapted to perform, and/or may perform, and/or shall be able to perform D2D enabled node or UE Rx-Tx time difference measurement provided certain specific DL subframes or DL subframes with specific signals (e.g. DL subframe #0 and/or DL subframe #5) and/or at least certain number of UL subframes or UL subframes with specific signals (e.g. at least 2 UL subframes per radio frame, subframes containing SRS etc) are available at the D2D enabled node or UE over the measurement time. This rule also requires the D2D enabled node or UE to skip D2D operation in certain subframe where D2D enabled node or UE has to perform D2D enabled node or UE Rx-Tx time difference measurement to meet the corresponding requirements;

the D2D enabled node or UE may be adapted to perform, and/or may perform, and/or shall be able to receive the DL component of a bidirectional measurement and/or transmit the UL component, e.g., the D2D enabled node or UE may be adapted to perform, and/or may perform, and/or shall be able to perform D2D enabled node or UE Rx-Tx time difference measurement provided certain specific DL subframes or DL subframes with specific signals (e.g. DL subframe #0 and DL subframe #5) and/or at least certain number of UL subframes or UL subframes with specific signals (e.g. at least 2 UL subframes per radio frame, subframes containing SRS etc) are available at the D2D enabled node or UE over the measurement time;

the D2D enabled node or UE may be adapted to receive, and/or may receive, and/or should be able to receive the DL component of an eNodeB Rx-Tx measurement and also to respond to it with transmitting the corresponding UL component of the same measurement;

the D2D enabled node or UE may be adapted to perform, and/or may perform, and/or shall be able to perform RSTD measurements and meet the corresponding requirements provided the condition on the minimum number (Nmin) of PRS subframes or positioning subframes per positioning occasion in reference and neighbour cells is met, where Nmin depends upon the PRS bandwidth e.g. 6 PRS subframes for 1.4 MHz (i.e. 6 RBs) and 1 PRS subframe for 10 MHz (i.e. 50 RBs);

For example, a few positioning subframes within a positioning occasions may need be configured to avoid or minimize the overlap between D2D and cellular DL;

In another example, RSTD measurements may be prioritized over D2D operation in the overlapping subframes;

the D2D enabled node or UE may be adapted to perform, and/or may perform, and/or shall be able to perform an inter-frequency or inter-RAT measurement and meet corresponding requirements provided that a certain number of DL subframes are available in the measured cell when the D2D enabled node or UE is not using measurement gaps;

the D2D enabled node or UE may be adapted to perform, and/or may perform, and/or shall be able to perform an inter-frequency or inter-RAT measurement and meet corresponding requirements provided that a certain number of DL subframes are available in the measured cell within a measurement gap (e.g., at least 4 full DL subframes are available within each measurement gap);

the D2D enabled node or UE may be adapted to perform, and/or may perform, and/or shall be able to perform CSI measurements and meet corresponding requirements provided that a certain number of DL subframes are available in the measured cell;

the D2D enabled node or UE may be adapted to perform, and/or may perform, and/or shall be able to receive a control channel and meet corresponding requirements provided that a certain number of DL subframes are available in the measured cell, e.g., PHICH with the network feedback (ACK/NCK) to the D2D enabled node or UE's UL transmission; sSynchronous HARQ may be used for UL-SCH transmission, implying synchronous retransmissions and synchronous HARQ feedback, i.e., the time instant for the retransmissions is fixed once the initial transmission has been scheduled and known to both D2D enabled node or UE and eNodeB. The maximum number of retransmissions is configured per D2D enabled node or UE;

PDCCH/EPDCCH with an UL resource grant;

PDCCH/EPDCCH with a D2D resource grant;

the D2D enabled node or UE may be adapted to perform, and/or may perform, and/or shall be able to determine CGI of a cell and meet corresponding requirements;

D2D enabled node or UE may be adapted to perform, and/or may perform, and/or shall be able to receive SI of a cell (e.g., one or more of: MIB, SIB1, any other SIB) and meet corresponding requirements;

D2D capable D2D enabled node or UE may be adapted to perform, and/or may perform, and/or shall be able to receive signals, perform the necessary measurements and meet the corresponding requirements, when the measurements are performed according to a measurement pattern (e.g., measurement restriction pattern specified for eICIC/FeICIC, positioning measurement pattern, measurement gap pattern, MBSFN subframe pattern, etc.).

If one or more subframes for D2D operations partly or fully overlap or expected to overlap with the measurement gap, then the D2D enabled node or UE may be adapted to create, and/or may create, and/or shall create and use the measurement gaps for performing inter-frequency and/or inter-RAT measurements. This rule explicitly requires the D2D enabled node or UE to prioritize the measurements in measurement gap over D2D operation;

the D2D enabled node or UE may be adapted to perform, and/or may perform, and/or shall perform one or more radio measurements (e.g. RSRP, RSRQ, RLM, CSI acquisition, D2D enabled node or UE Rx-Tx time difference, RSTD, etc.) over an extended measurement time (aka second measurement time) in case one or more subframes used for radio measurements partly or fully overlap with the subframes for performing D2D operation during the first measurement time. The first measurement time is the time over the D2D enabled node or UE does measurement when no subframes for performing D2D operation occur;

in general, a rule could be defined that the D2D capable D2D enabled node or UE may be adapted to perform, and/or may perform, and/or shall perform one or more radio measurements (i.e. on cellular signals) provided at least N number of subframes per unit time (e.g. per radio frame, over the measurement time etc) and/or certain types of subframes (e.g. subframes #0 and/or 5) are available at the D2D enabled node or UE;

yet another general rule could be defined that if the D2D capable D2D enabled node or UE is configured to perform D2D operation and one or more radio measurements, then the D2D enabled node or UE may be adapted to perform, and/or may perform, and/or shall perform the one or more radio measurements and meet their corresponding measurement requirements;

there may be defined also a common set of time instances (e.g., subframes) to be used by the D2D enabled node or UE for performing two or more measurement types, and the time instances in this common set may need to be made available for the measurements to meet the corresponding measurement requirements. How many measurements may be performed in parallel may be limited, however, by the D2D enabled node or UE parallel measurement capability and its reporting capability (since the D2D enabled node or UE may also need to report these parallel measurements).

Typically any one or more of the above rules may be pre-defined. The D2D enabled node or UE may be required and/or adapted to store one or more than one of the rules, in particular pre-defined rules, and may be adapted to apply, and/or apply, the rules when the conditions related to the rules are met. Alternatively, the rules may be pre-defined but the D2D enabled node or UE may be adapted to apply, and/or apply, the rules when the D2D is explicitly indicated or instructed or configured by the network node, e.g. configured with a pre-defined identifier of the pre-defined rule. The network node may be adapted to transmit, and/or transmit, corresponding allocation or configuration data, which may comprise a corresponding indication.

Methods in a network node of controlling D2D enabled node or UE rx sharing are discussed in the following.

According to this aspect, a network node implements and/or performs, and/or may be adapted to implement and/or perform, one or more methods, which may ensure that the D2D enabled node or UE can perform cellular DL operation and/or D2D operation while meeting one or more pre-defined requirements or complying with one or more rules.

For example, the network node may be adapted to ensure or instruct or configure the D2D enabled node or UE, and/or ensure or instruct or configure it, such that a certain number of subframes are available for specific D2D enabled node or UE measurements, e.g., to match the necessary subframes with available subframes or make the necessary subframes available for measurement by avoid overlap in those subframes with operations which may disturb measurements or configure priority to ensure that the necessary measurements are performed. The network node may be adapted to transmit, and/or may transmit, corresponding allocation data to configure and/or instruct and/or ensure.

Some more specific examples are below, any one of which and/or any combination of which may be implemented:

indicate priority to the D2D enabled node or UE (e.g., when the subframes may be not sufficient for the necessary measurements due to overlap between D2D subframes and cellular DL subframes); according to these priorities, the D2D enabled node or UE may decide whether the measurements are to be performed for cellular DL or D2D in the overlapping subframes. In a further embodiment, the priority may be associated with not all but some of the overlapping subframes;

adapt cell timing;

adapting TDD UL/DL and/or special subframe configuration on f1 and/or f2 to control the appearance in time of DL, special subframes, or UL subframes (UL subframes may be used for D2D);

adapting D2D configuration. For example the network node may avoid configuring those subframes for D2D that may partly or fully overlap with certain subframes used or expected to be used by the D2D enabled node or UE for cellular operation i.e. for radio measurements. For example D2D-configured subframes or UL subframes (which may be potentially used for D2D) overlapping with DL subframes #0 and #5 are avoided for D2D operation;

adapting D2D enabled node or UE cellular DL measurement configuration (e.g., periodicity, number of consecutive subframes, measurement bandwidth, etc.). For example the network node may be adapted to reduce, and/or may reduce, the number of consecutive PRS subframes from 6 to 4 and increase the PRS bandwidth from 25 RBs to 50 RBs in case some of PRS subframes overlap with UL subframes for D2D operation;

indicating adaptively (e.g., to reduce the overlap) which DL subframes shall be measured;

indicating adaptively which subframes for D2D are to be and/or shall be measured;

adapting measurement gap configuration (e.g., to avoid or minimize collisions with the other operation);

adapting activity state configuration (e.g., DRX configuration of the D2D enabled node or UE);

adapting at least one parameter or configuration to ensure that a network feedback is received by the D2D enabled node or UE, e.g.:

adapting the configuration of the D2D enabled node or UE UL transmissions to ensure that the network feedback can be received by the D2D enabled node or UE (e.g., adapting the number of retransmissions, adapting HARQ configuration, using asynchronous HARQ instead if synchronous HARQ, turn off a D2D enabled node or UE UL transmission if the feedback cannot be received, etc.);
  adapting the configuration of the feedback transmission configuration to ensure that the network feedback can be received by the D2D enabled node or UE (e.g., using asynchronous HARQ instead if synchronous HARQ, sending the feedback in the subframes the D2D enabled node or UE can receive, etc.);
  indicating to the D2D enabled node or UE explicitly the subframes where it shall receive the network feedback.
adapting measurement pattern configuration (e.g., to avoid or minimize the overlap between the subframes for measurements indicated by the pattern and D2D subframes); examples of measurement patterns: measurement gap configuration, measurement restriction pattern for eICIC/FeICIC, positioning measurement pattern, MBSFN pattern, etc. For example the network node may indicate restricted subframes in a resource restriction measurement pattern that don't overlap with subframes for D2D operation;
adapting MBMS measurement configuration;
adapting MBMS configuration sent to the D2D enabled node or UE (including PMCH) to control when the D2D enabled node or UE shall receive MBMS service;
adaptively configuring a different control channel, e.g., EPDCCH instead of PDCCH or vice versa, to ensure that it can be received by the D2D enabled node or UE operating D2D e.g. trying to avoid/reduce the risk of overlap of D2D operation;
adaptively configuring (e.g., in time) D2D enabled node or UE UL transmissions to ensure that DL transmissions are received by the D2D enabled node or UE, e.g., are not lost due to D2D operation or a certain number of DL retransmissions may still be received by the D2D enabled node or UE;
adaptively configuring (e.g., increasing) the number of (re)transmissions of DL channel retransmissions or redundancy versions, when there is a probability that some of them may be missed by the D2D enabled node or UE due to the D2D operation.
Controlling at least one DL timer and/or the number of retransmissions of associated UL transmissions and/or increasing the number of DL retransmissions, to ensure that a DL channel/signal is properly received by the D2D enabled node or UE when there is a risk of losing some of transmissions due to D2D operation;
The adaptation may further comprise, e.g.:
sending the adapted configuration to at least one D2D enabled node or UE or to another network node (e.g., another eNodeB, positioning node, MBMS server, D2D server, etc.);
sending a set of common time instances (e.g., subframes) for cellular measurements to another eNodeB via X2.

The network node may implement the following non-limiting set of steps:
Step N1: Obtaining information about D2D enabled node or UE D2D operation on f1,
Step N2: Obtaining information about D2D enabled node or UE cellular DL operation on f2,
Step N3 (optional): Determining priority of the cellular DL operation and/or D2D operation for the D2D enabled node or UE,
  In one example, the priority may be pre-defined (see also corresponding examples)
Step N4: Adapting at least one of the D2D operation and cellular DL operation to meet one or more requirements or to comply with one or more rules to ensure a certain level of the cellular DL performance.
  Optionally, the network node may be adapted to perform, and/or may perform, determining the need for adaptation (see similar examples for D2D enabled node or UE). A network device may comprise a NW adaptation need determination module for determining the need for adaptation.

In the above, the obtaining steps may comprise reading the information from storage and/or internal/external memory or database, autonomously obtaining and/or requesting information from another D2D enabled node or UE or from another network node. The network node may in fact itself configure the D2D enabled node or UE for operating on f1 and f2 and thus have the information available.

Alternatively or additionally, a network node may implement and/or perform, and/or be adapted to perform and/or implement, the following non-limiting set of steps or method (e.g., amounting to skipping Steps N1 and N2 in the previous flow):
Step M1 (optional): Determining priority of the cellular DL operation and/or D2D operation for the D2D enabled node or UE,
  In one example, the priority may be pre-defined (see also corresponding examples)
Step M2: Adaptively configuring at least one of the D2D operation and cellular DL operation to meet one or more requirements or to comply with one or more rules to ensure a certain level of the cellular DL performance.
  Optionally, the network node may also perform determining of the need for adaptation (see similar examples for D2D enabled node or UE)

Alternatively or additionally to the variants already disclosed, a network device may comprise a NW configuration module for adaptively configuring according to step M2. Optionally, the network device may furthermore comprise a NW priority determination device according to step M1.

Generally, a D2D device may be for performing and/or implementing a method for and/or of and/or for a D2D enabled node or UE as disclosed herein and/or which the D2D enabled node or UE is adapted to perform and/or implement. The D2D device may comprise corresponding modules. A network device may be for performing and/or implementing a method for and/or of and/or for a network node as disclosed herein and/or which the network node is adapted to perform and/or implement. The network device may comprise corresponding modules.

Generally, when the D2D enabled node or UE is configured to perform D2D operation (e.g. D2D signal reception in UL subframes on f1) and also configured to perform radio measurements on cellular signals (e.g. cell identification, RSRP/RSRQ measurements in DL subframes on f2), and if the D2D enabled node or UE cannot receive D2D signals and cellular signals at the same time, then the D2D enabled node or UE may be configured to perform one of the two types of operation (e.g., D2D or cellular) based on pre-defined rule and/or indication received from the network node.

There is also disclosed a D2D enabled node, which may be adapted to perform any one or any one combination of the methods and/or comprise any one or any one combination of the features described herein in the context of a D2D enabled node. In particular, control circuitry and/or a controller of the D2D enabled node may be adapted to control and/or perform the method and/or steps of the method. The D2D enable node may be a node of and/or for a wireless communication network.

There is also disclosed a network node, which may be adapted to perform any one or any one combination of the methods and/or comprise any one or any combination of the features described herein in the context of a network node. In particular, control circuitry and/or a controller of the network node may be adapted to control and/or perform the method and/or steps of the method. The network node may be a node of and/or for a wireless communication network.

There is also disclosed a method, in particular in and/or for D2D operation of a network, which may combine any of the steps of the methods for operating a D2D enabled node and a network node described herein.

There are also disclosed one or more software devices, e.g. a D2D device and/or a network device comprising suitable modules adapted to perform the steps of any of the methods described herein.

Generally, there is also disclosed a computer program product comprising instructions executable by control circuitry and/or a computing device, the instruction causing the control circuitry and/or computing device to carry out and/or control any one of the methods described herein when executed by the control circuitry and/or computing device. The control circuitry and/or computing device may be implemented in any one or more than one of the nodes to carry out and/or control corresponding methods or method steps.

Modules performing method steps described herein may generally be implemented in software and/or hardware and/or firmware in and/or on corresponding nodes. Modules of or on or in one node or device, in particular modules for a D2D device or network device, may be implemented in a common module or flow and/or in parallel and/or independent modules or flows and/or share functionality.

A D2D enabled node may generally be a node adapted to perform D2D communication, in particular transmission and/or reception, and/or at least one type of D2D operations. In particular, a D2D enabled node may be a terminal and/or user equipment. The D2D enabled node may be adapted to transmit and/or receive D2D data based on allocation data, in particular on and/or utilizing resources indicate in the allocation data. D2D communication and/or transmission by a D2D enabled node may in some variants be in UL resources and/or at least one corresponding carrier or frequency and/or modulation.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions.

Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services.

Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered. A node of a wireless communication network may be implemented as a user equipment and/or base station and/or relay node and/or any device generally adapted for device-to-device communication.

A wireless communication network may comprise at least one of a device configured for device-to-device communication and/or a user equipment and/or base station and/or relay node, in particular at least one user equipment, which may be arranged for device-to-device communication with a second node of the wireless communication network, in particular with a second user equipment. A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes. A cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

Pertaining to device-to-device (D2D), in some examples, the terms D2D' or 'proximity service' (ProSe) or 'peer-to-peer communication' may be used interchangeably.

A D2D enabled node may be a UE, which may be D2D capable, and may be referred to as D2D enabled or capable UE. It may comprise any entity or device or node capable of at least receiving or transmitting radio signals on a direct radio link, i.e., between this entity and another D2D capable entity. A D2D-capable device or D2D enabled node may for example be comprised in or comprise a cellular UE, PDA, a wireless device, laptop, mobile, sensor, relay, D2D relay, a small base station employing a UE-like interface, etc.

A D2D enabled node or UE is able to support at least one D2D operation. A D2D enabled node may generally be adapted for cellular operation and/or communication in a wireless communication network. A D2D enabled node may generally comprise radio circuitry and/or control circuitry for wireless communication, in particular D2D operation or communication and cellular operation or communication. A D2D device may be a software/program arrangement arranged to be executable by a hardware device, e.g. control circuitry, and/or storable in a memory of e.g. a UE or terminal, which may provide D2D functionality and/or corresponding control functionality to e.g. a UE or terminal.

D2D operation may comprise any action or activity related to D2D or D2D communication and may be used interchangeably D2D communication. D2D operation may include, e.g., transmitting or receiving a signal/channel type or data for D2D purposes and/or in D2D operation, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D.

D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a D2D enabled node or UE. A D2D receive operation may comprise receiving, by a D2D enabled node, of D2D data and/or signals. A D2D transmit operation may comprise transmitting, by a D2D enabled node, of D2D data and/or signals. A D2D enabled node performing at least one D2D operation may be considered to be in D2D or D2D mode or in D2D operation.

Cellular operation (in particular by a D2D enabled node or UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission may be any transmission by a D2D enabled node or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link may be intended for receiving by another D2D device. A D2D transmission may be a unicast, groupcast, or broadcast transmission. A D2D transmission may be on the uplink time-frequency resources of a wireless communication system.

A coordinating or controlling or allocating node may be a node or network node that is adapted to schedule, decide and/or select and/or allocate, at least in part, time-frequency resources to be used for at least one of: cellular transmissions and D2D transmissions. The coordinating node may also provide the scheduling information to another node such as another D2D enabled node, a cluster head, a radio network node such as eNodeB, or a network node (e.g. a core network node), MME, positioning node, D2D server, RNC, SON, etc). The network node or coordinating node may communicate with a radio network node. It may be envisioned that a coordinating node may also perform coordination for one or more D2D enabled node or UEs. The coordination may be performed in a centralized or distributed manner. A coordinating node may provide the functionality of an allocation node. A network device may be a software/program arrangement arranged to be executable by a hardware device, e.g. control circuitry, and/or storable in a memory of a network node, which may provide D2D functionality and/or corresponding control functionality to e.g. network node.

Pertaining to a radio spectrum it should be noted, that although at least some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

A cellular network or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A network node may be a radio network node (which may be adapted for wireless or radio communication, e.g. with a D2D enabled node or a UE) or another network node. A network node generally may be an allocation node or coordinating node. Some examples of the radio network node are a radio base station, eNodeB, a relay node, an access point, a cluster head, RNC, etc. The radio network node may be comprised in a wireless communication network and may also support cellular operation.

A network node, in particular a radio network node, may comprise radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Any network node may comprise control circuitry and/or a memory. A network node may be considered to be serving a D2D enabled node or UE, if it provides a cell of a cellular network to the served node or D2D enabled node or UE and/or is connected or connectable to the D2D enabled node or UE via and/or for transmission and/or reception and/or UL and/or DL data exchange or transmission and/or if the network node is adapted to provide the D2D enabled node or UE with allocation and/or configuration data and/or to configure the D2D enabled node or UE.

Multiple carrier frequencies or functionality may refer to any of: different carrier frequencies within the same frequency band or within different frequency bands, same PLMN or different PLMNs, same RAT or different RATs. D2D operation may or may not occur on dedicated carrier frequencies. DL and UL carrier frequencies in FDD are also examples of different carrier frequencies. A frequency band herein may be FDD, TDD, HD-FDD, or unidirectional (e.g., DL-only band such as Band 29, in some examples). Multiple carrier functionality may include carrier aggregation functionality.

A D2D enabled node may generally be a node adapted to perform D2D communication, in particular transmission and/or reception, and/or at least one type of D2D operations. In particular, a D2D enabled node may be a terminal and/or user equipment and/or D2D enabled machine and/or sensor. The D2D enabled node may be adapted to transmit and/or receive D2D data based on allocation data, in particular on and/or utilizing resources indicate in the allocation data. D2D communication and/or transmission by a D2D enabled node may generally be in UL resources and/or corresponding carrier or frequency and/or modulation. In this context, stopping D2D communication in response and/or based on a release message may be considered to correspond to transmitting based on allocation data, wherein the release message may be considered to be allocation data.

A D2D enabled node (such as a UE) may be adapted for and/or capable of CA or CA operation. In particular, it may be adapted to transmit and/or receive one or more than one CCs and/or utilising, and/or participating in, carrier aggregation. A D2D enabled node may be adapted to configure itself according to configuration data, which may include setting up and/or scheduling resources and/or equipment for receiving and/or transmitting and/or sharing of resources and/or in particular D2D operation and/or cellular operation based on the configuration data. Configuration data may be received, by the D2D enabled node, from another node, in particular a network node. A network node, in particular a controlling and/or allocating node, may generally be adapted to provide and/or determine and/or transmit configuration data, in particular to a D2D enabled node. Configuration data may be considered to be a form of allocation data and/or may be provided in the form of a message and/or data packet/s. Configuring a D2D enabled node or UE, e.g. configuring of the node by a network node, may include determining and/or transmitting configuration data to the node to be configured, i.e. the D2D enabled node or UE.

Determining the configuration data and transmitting this data to a D2D enabled node or UE may be performed by different nodes, which may be arranged such that they may communicate and/or transport the configuration data between each other, in particular such that the node determining or adapted to determine the configuration data may transmit the configuration data to the node transmitting it or adapted to transmit it; the latter node may be adapted to receive the configuration data and/or relay and/or provide a message bases on the configuration data, e.g. by reformatting and/or amending and/or updating data received.

Transmit power (or power density) may generally refer to the power (or power density) of a signal transmitted or generally to the power of wireless transmission. Transmit power (or power density) may in particular refer to the power (or power density) of a signal transmitted by and/or transmissions of a D2D enabled node or UE. Transmit power generally may refer to a specific channel and/or frequency and/or cell and/or carrier and/or bandwidth and/or carrier aggregate and/or a general setup. UL transmit power, or shorter UL power, may refer to the power of a signal transmitted, in particular by a D2D enabled node or UE, in cellular operation and/or to or for a network node serving the D2D enabled node or UE, for example a base station or eNodeB. D2D transmit power (or power density) may refer to the power (or power density) of a signal transmitted, in particular by a D2D enabled node or UE, in D2D operation and/or for D2D transmission. Transmit power (or power density) may refer to or pertain to a time unit or interval, e.g. a slot, subframe or frame, and/or transmit power control may be performed for and/or updated in such units or intervals. Power control or transmit power control may generally refer to control of transmit power and/or transmit power spectral and/or temporal density. Power control commands in TPC format or TPC may be used for controlling power and/or to cause a D2D enabled node or UE receiving at least one such command or TPC message to control power based on and/or according to the command or TPC. The command or TPC may be transmitted to the D2D enabled node from or via a network node, in particular a base station or eNB or allocating node.

Capability data and/or a capability indication or indication message may provide and/or comprise capability information. In this context, the capability may refer to whether the D2D enabled node or UE is capable of operating simultaneously perform D2D and cellular operations on a combination of carriers and/or frequency bands and/or to which combination/s of carriers and/or frequency bands a D2D enabled node or UE can be configured, and/or is operable in and/or adapted to operate in, to simultaneously perform D2D and cellular operations; or at least a part of the corresponding combinations. Capabilities information and/or the indication or indication message, may indicate explicitly or implicitly one, or at least one, or a plurality of, combination/s of carriers and/or frequency bands on which the D2D enabled node or UE can be configured and/or is operable in and/or adapted to operate in, to simultaneously perform D2D and cellular operations, and/or may comprise parameters and/or parameter values and/or indication and/or information regarding the capabilities of the D2D enabled node.

The capability indication or indication message may be transmitted or transmittable as a D2D transmission or a cellular transmission. It may be envisioned that a D2D enabled node or UE determines and/or transmits and/or is adapted to determine and/or transmit such a message either and/or both as a D2D transmission and as a cellular transmission. In particular, a D2D enabled node or UE may transmit or be adapted to transmit the indication or indication message as D2D transmission, in particular based on the target of the transmission being, and/or if the target of the transmission is, a second D2D enabled node or UE, and/or based on corresponding D2D resources being, and/or if corresponding D2D resources are, allocated to the D2D enabled node or UE. Alternatively or additionally, the D2D enabled node or UE may transmit, and/or be adapted to transmit, the indication or indication message in or with a cellular transmission or operation, in particular if the target node is not a D2D enabled node and/or based on cellular or only cellular resources being allocated to the D2D enabled node or UE. A D2D enabled node may be adapted to obtain capabilities information, e.g. by reading it from a memory or storage, which may be a memory or storage of the D2D enabled node or UE.

A D2D device may comprise an obtaining module for obtaining capabilities information, e.g. as described herein. Additionally or alternatively, a D2D device may comprise a capabilities information transmitting device for transmitting a capabilities indication or indication message as described herein.

Cellular DL operation of a D2D enabled node or UE may refer to receiving transmissions in DL, in particular in cellular operation and/or from a network node/eNB/base station. Cellular UL operation of a D2D enabled node or UE may refer to UL transmissions, in particular in cellular operation, e.g. transmitting to a network node/eNB/base station.

Indicating an information and/or condition, in particular indicating by a first node to a second node, may comprise transmitting the information, a corresponding message and/or data and/or indication, in particular from the first node to the second node node, e.g. via a cellular transmission or a D2D transmission, or if the first node and second node are connected by cable, via cable.

A user equipment (UE) may generally be a device configured for wireless device-to-device communication and/or a terminal for a wireless and/or cellular network, in particular a mobile terminal, for example a mobile phone, smart phone, tablet, PDA, etc.

A user equipment may be a node of or for a wireless communication network as described herein, in particular a D2D enabled node. It may be envisioned that a user equipment is adapted for one or more RATs, in particular LTE/E-UTRA. A user equipment may generally be proximity services (ProSe) enabled, which may mean it is D2D capable or enabled. It may be considered that a user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment. It may be considered that a user equipment is configured to be a user equipment adapted for LTE/E-UTRAN.

A base station may be any kind of base station of a wireless and/or cellular network adapted to serve one or more user equipments. It may be considered that a base station is a node of a wireless communication network. A base station may be adapted to provide and/or define one or more cells of the network and/or to allocate frequency and/or time resources for communication to one or more nodes of a network, in particular UL resources, for example for device-to-device communication, which may be communication between devices different from the base station. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry.

A base station may be arranged to be a node of a wireless communication network, in particular configured for and/or to enable and/or to facilitate and/or to participate in device-to-device communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled.

An eNodeB (eNB) may be envisioned as an example of a base station. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for device-to-device communication between two nodes of a wireless communication network, in particular two user equipments.

Device-to-device (D2D) communication or operation may generally refer to communication between nodes of a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments. Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or coordinating node and/or with a base station or coordinating node providing merely auxiliary services, e.g. configuration data or a transmission configuration or related information for a message intended for device-to-device communication between user equipments. In the latter case, it may be considered that data and/or signals flowing between the nodes performing device-to-device communication are not transported via the base station and/or coordinating node. In contrast, during cellular communication, network layers above the eNB/base station/coordination node may generally be involved, in particular core layers which may be connected to the eNB/base station/coordinating node via cable/land line. During device-to-device communication, a message may be provided and/or transmitted and/or received.

A message may be considered to be or be represented by a batch of physical layer transmissions and/or may comprise such. A message may comprise information regarding the transmission configuration, in particular regarding related information, e.g. in a header, and/or a payload. A unidirectional message may be a message for connectionless communication and/or for which no prior communication and/or prior connection between the transmitting node and receiving node is necessary and/or available and/or for which no response or no response protocol or no handshake is expected. A device configured for and/or capable of device-to-device communication, which may be called D2D enabled device or node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Allocated resources may generally be frequency and/or time resources. Allocated resources may comprise frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first D2D enabled node to transmit to and/or for a second D2D enabled node. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more D2D enabled nodes, in particular to a first D2D enabled node. Accordingly, D2D resource allocation may be performed by the network and/or by a node, in particular a node within and/or within a cell of a cellular network covering the D2D enabled nodes participating or intending to participate in the D2D communication.

Allocation data may be considered to be data indicating and/or granting resources allocated by the allocation node, in particular data identifying or indicating which resources are reserved or allocated for D2D communication for a D2D enabled node and/or which resources a D2D enabled node may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. Generally, allocation data may indicate and/or instruct transmission mode and/or configuration, in particular regarding a power level of transmission, e.g. for the D2D enabled node. The D2D enabled node may generally be adapted to perform transmission configuration according to allocation data, in particular to set a corresponding power level. It may be considered that allocation data comprises and/or is implemented as TPC and/or in TPC format.

A D2D transmission may be considered to be of a different type than a cellular and/or UL transmission. A transmission may pertain to a specific frequency and/or spectrum and/or bandwidth and/or carrier.

A receiver or receiver chain may generally be provided by a transceiver arrangement, which may have transmitting capabilities included, or as a separate arrangement, which may be implemented without having transmitting capacities included.

A measurement gap may refer to a time gap or interval, in which no transmission and reception happens, in particular regarding a serving cell or a given carrier. Since there is no signal transmission and reception during the gap (at least in the serving cell or given carrier), a D2D enabled node or UE can switch to another or a target cell or carrier and/or perform a measurement on the target cell or carrier, e.g. for signal quality, utilizing the same receiver.

The term "intra-frequency" may refer to issued related to the same frequency/bandwidth and/or carrier, e.g. between neighboring cells (which may be provided by different BSs) having the same frequencies available. The term "inter-frequency" may refer to issues related to different frequencies/bandwidths and/or carriers, e.g. between different carriers in a multi-carrier arrangement.

A receiving operation may comprise a measurement operation, e.g. a signal quality measurement, which may be performed in a measurement gap, in which a receiver switching to a carrier/frequency to be measured may be performed.

Some useful abbreviations are:
3GPP $3^{rd}$ Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink EPDCCH Enhanced Physical DL Control CHannel
DL Downlink; generally referring to transmission of data to a node/into a direction further away from network core (physically and/or logically); in particular from a base station or eNodeB to a D2D enabled node or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
L1 Layer 1
L2 Layer 2
LTE Long Term Evolution, a telecommunications standard
MAC Medium Access Control
MBSFN Multiple Broadcast Single Frequency Network
MDT Minimisation of Drive Test
MIB Master Information Block
NW Network
OFDM Orthogonal Frequency Division Multiplexing
O&M Operational and Maintenance
OSS Operational Support Systems
PC Power Control
PDCCH Physical DL Control CHannel
PH Power Headroom
PHR Power Headroom Report
PSS Primary Synchronization Signal
PUSCH Physical Uplink Shared CHannel
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SIB System Information Block
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These and other abbreviations may be used according to LTE standard definitions.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims, in particular in the light of the description and drawings.

The invention claimed is:

1. A device-to-device (D2D)-enabled node for a wireless communication network, wherein:
   the D2D-enabled node is configured to perform D2D communication with one or more other D2D-enabled nodes and is configured to perform a D2D operation on a first carrier frequency or band (f1) and a cellular operation on a second carrier frequency or band (f2);
   the D2D-enabled node is further configured to obtain information about D2D operation on f1 and to obtain information about cellular downlink (DL) operation on f2, and is configured to adapt the D2D operation, based on the obtained information about D2D operation on f1 and the obtained information about cellular DL operation on f2, to meet one or more requirements or to comply with one or more rules;

wherein the obtained information about cellular DL operation on f2 comprises information identifying resource usage by cellular DL transmissions; and wherein adapting the D2D operation comprises adjusting usage of resources for D2D operation to avoid at least some use of resources overlapping with cellular DL operation, based on the information identifying resource usage by cellular DL transmissions.

2. The D2D-enabled node of claim 1, wherein the adapting at the D2D operation that the D2D-enabled node is configured to do comprises at least one of: establishing a time relation between f1 and f2; determining the need for adaptation; and adaptation.

3. The D2D-enabled node of claim 1, wherein the adapting the D2D operation that the D2D-enabled node is configured to do comprises adapting the receiver configuration while receiving system information.

4. The D2D-enabled node of claim 3, wherein the system information comprises at least one or more of: a Master Information Block (MIB), a System Information Block 1 (SIB1), and another System Information Block (SIB).

5. A method performed by a device-to-device (D2D)-enabled node for a wireless communication network, the D2D-enabled node being adapted to perform D2D communication with one or more other D2D-enabled nodes, the method comprising:

performing a D2D operation on a first carrier frequency or band (f1) and a cellular operation on a second carrier frequency or band (f2);

obtaining information about D2D operation on f1 and obtaining information about cellular downlink (DL) operation on f2, wherein the obtained information about cellular DL operation on f2 comprises information identifying resource usage by cellular DL transmissions; and adapting the D2D operation to meet one or more requirements or to comply with one or more rules, based on the obtained information about D2D operation on f1 and the obtained information about cellular DL operation on f2, to ensure a certain level of the cellular DL performance, wherein adapting the D2D operation comprises adjusting usage of resources for D2D operation to avoid at least some use of resources overlapping with cellular DL operation, based on the information identifying resource usage by cellular DL transmissions.

6. The method of claim 5, wherein the adapting comprises at least one of: establishing a time relation between f1 and f2; determining the need for adaptation; and adaptation.

7. The method of claim 5, wherein the adapting comprises adapting the receiver configuration while receiving system information.

8. The method of claim 7, wherein the system information comprises at least one or more of: a Master Information Block (MIB), a System Information Block 1 (SIB1), and another System Information Block (SIB).

9. A method performed by a device-to-device (D2D)-enabled node for a wireless communication network, the D2D-enabled node being adapted to perform D2D communication with one or more other D2D-enabled nodes, the method comprising:

performing a D2D operation on a first carrier frequency or band (f1) and a cellular operation on a second carrier frequency or band (f2);

obtaining information about D2D operation on f1 and obtaining information about cellular downlink (DL) operation on f2, wherein the obtained information about cellular DL operation on f2 comprises information identifying resource usage by cellular DL transmissions; and adapting the cellular DL operation to meet one or more requirements or to comply with one or more rules, based on the obtained information about D2D operation on f1 and the obtained information about cellular DL operation on f2, to ensure a certain level of the cellular DL performance, wherein adapting the cellular DL operation comprises adjusting timing of cellular DL operation to avoid at least some use of resources overlapping with D2D operation, based on the information identifying resource usage by cellular DL transmissions.

* * * * *